US012792394B2

(12) United States Patent
Zhang et al.

(10) Patent No.: US 12,792,394 B2
(45) Date of Patent: Nov. 10, 2026

(54) RESOURCE SCHEDULING METHOD, RESOURCE SCHEDULING SYSTEM, AND DEVICE

(71) Applicant: ZTE CORPORATION, Shenzhen (CN)

(72) Inventors: Chengming Zhang, Shenzhen (CN); Bo Tang, Shenzhen (CN); Kewen Wang, Shenzhen (CN); Bingtao Han, Shenzhen (CN); Yongcheng Wang, Shenzhen (CN); Yaofeng Tu, Shenzhen (CN); Hong Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 798 days.

(21) Appl. No.: 18/004,067

(22) PCT Filed: Jun. 30, 2021

(86) PCT No.: PCT/CN2021/103638
§ 371 (c)(1),
(2) Date: Jan. 2, 2023

(87) PCT Pub. No.: WO2022/002148
PCT Pub. Date: Jan. 6, 2022

(65) Prior Publication Data

US 2023/0266999 A1 Aug. 24, 2023

(30) Foreign Application Priority Data

Jul. 1, 2020 (CN) ......................... 202010625668.0

(51) Int. Cl.
*G06F 9/48* (2006.01)
*G06F 9/50* (2006.01)

(52) U.S. Cl.
CPC .............. *G06F 9/4881* (2013.01); *G06F 9/50* (2013.01)

(58) Field of Classification Search
CPC .. G06F 9/4881; G06F 9/50; G06F 2209/5017; G06F 9/5038; G06F 9/5077;
(Continued)

(56) References Cited

U.S. PATENT DOCUMENTS 9,880,881 B1 * 1/2018 Perez .................... G06F 9/5083
2020/0026562 A1 * 1/2020 Bahramshahry .... H04L 41/5009
(Continued)

FOREIGN PATENT DOCUMENTS

CN 102739770 A 10/2012
CN 108228354 A 6/2018
(Continued)

OTHER PUBLICATIONS

International Searching Authority. International Search Report and Written Opinion for PCT Application No. PCT/CN2021/103638 and English translation, mailed Oct. 9, 2021, pp. 1-10.
(Continued)

*Primary Examiner* — Peng Ke
(74) *Attorney, Agent, or Firm* — Vivacqua Crane, PLLC

(57) ABSTRACT

A resource scheduling method, a resource scheduling system, a device, and a computer-readable storage medium are disclosed. The resource scheduling method may include: obtaining a scheduling object from a scheduling queue (S100); and when the scheduling object is a customized resource, splitting the customized resource according to the current resource state to obtain a scheduling unit list (S200), the scheduling unit list including first scheduling units configured to form the customized resource; and sequentially scheduling the first scheduling units in the scheduling unit list (S300).

20 Claims, 7 Drawing Sheets

(58) Field of Classification Search
CPC .......... G06F 9/48; G06F 9/5027; G06F 9/505; G06F 9/5061; G06N 20/00; G06N 3/08; H04L 67/1036; H04L 67/1004; H04L 67/1095
See application file for complete search history.

(56) References Cited

U.S. PATENT DOCUMENTS

| | | | | |
|---|---|---|---|---|
| 2020/0073727 | A1* | 3/2020 | Louer | G06F 9/52 |
| 2020/0153898 | A1* | 5/2020 | Sabath | G06F 9/4856 |
| 2021/0103468 | A1* | 4/2021 | Wang | G06F 9/5044 |

FOREIGN PATENT DOCUMENTS

| | | | |
|---|---|---|---|
| CN | 110244964 | A | 9/2019 |
| CN | 111274191 | A | 6/2020 |

OTHER PUBLICATIONS

Arundel, J., et al. "Cloud Native DevOps with Kubernetes: Building, Deploying, and Scaling Modern Applications in the Cloud," Jan. 24, 2014, pp. 170-177.
European Patent Office. Extended European Search Report for EP Application No. 21833960.4, mailed Nov. 20, 2023, pp. 1-11.

* cited by examiner

RESOURCE SCHEDULING METHOD, RESOURCE SCHEDULING SYSTEM, AND DEVICE

CROSS-REFERENCE TO RELATED APPLICATION

This application is a national stage filing under 35 U. S.C. § 371 of international application number PCT/CN2021/103638, filed Jun. 30, 2021, which claims priority to Chinese patent application No. 202010625668.0 filed Jul. 1, 2020. The contents of these applications are incorporated herein by reference in their entirety.

TECHNICAL FIELD

The present disclosure relates to the field of computer technologies, and specifically to a resource scheduling method, a resource scheduling system, a device, and a computer-readable storage medium.

BACKGROUND

As the most mainstream container orchestration and scheduling platform at present, Kubernetes can support the management of Custom Resource Definitions (CRDs) through good scalability, allowing users to manage customized resources as a whole object entity. However, at present, Kubernetes only supports the scheduling of Pods. To schedule CRDs, a special scheduler is required. Resource scheduling conflicts will occur among multiple schedulers. The following problems will also arise: resources cannot meet a resource request for CRDs, so that the CRDs cannot be scheduled; and even if a CRD can be successfully scheduled, the CRD is not scheduled according to an optimal resource allocation mode, and thus the operational efficiency is reduced.

SUMMARY

The following is a summary of the subject matter set forth in this description. This summary is not intended to limit the scope of protection of the claims.

The present disclosure provides a resource scheduling method, a resource scheduling system, a device, and a computer-readable storage medium.

In accordance with an aspect of the present disclosure, an embodiment provides a resource scheduling method. The method may include: obtaining a scheduling object from a scheduling queue; in response to the scheduling object being a customized resource, splitting the customized resource according to a current resource state to obtain a scheduling unit list, where the scheduling unit list includes scheduling units configured to form the customized resource; and sequentially scheduling the scheduling units in the scheduling unit list.

In accordance with another aspect of the present disclosure, an embodiment provides a resource scheduling system. The system may include: a scheduler, configured for obtaining a scheduling object from a scheduling queue; and a splitter, configured for: in response to the scheduling object being a customized resource, splitting the customized resource according to a current resource state to obtain a scheduling unit list, where the scheduling unit list includes scheduling units configured to form the customized resource; where the scheduler is further configured for sequentially scheduling the scheduling units in the scheduling unit list.

In accordance with another aspect of the present disclosure, an embodiment provides a device. The device may include: a memory, a processor, and a computer program stored in the memory and executable by the processor which, when executed by the processor, causes the processor to implement the resource scheduling method described above.

In accordance with another aspect of the present disclosure, an embodiment provides a non-transitory computer-readable storage medium, storing a computer-executable instruction which, when executed by a processor, causes the processor to implement the resource scheduling method described above.

Additional features and advantages of the disclosure will be set forth in the description which follows, and at least in part will be apparent from the description, or may be learned by the practice of the disclosure. The objects and other advantages of the present disclosure can be realized and obtained by the structures particularly pointed out in the description, claims, and drawings.

BRIEF DESCRIPTION OF DRAWINGS

The drawings are provided for a understanding of the technical schemes of the present disclosure, and constitute a part of the description. The drawings are used in conjunction with the embodiments of the present disclosure to illustrate the technical schemes of the present disclosure, and do not constitute a limitation to the technical schemes of the present disclosure.

DETAILED DESCRIPTION

Figure 1:
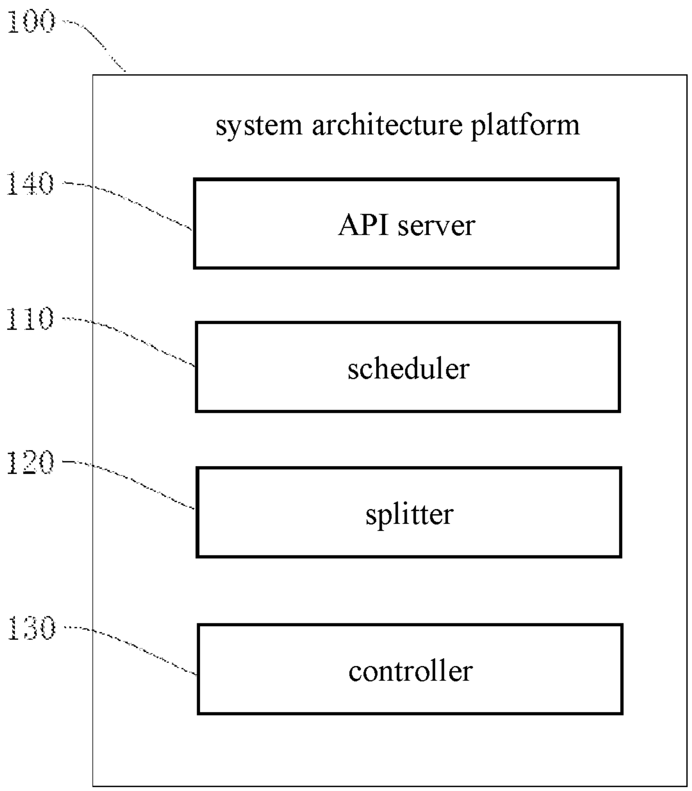
FIG. 1 is a schematic diagram of a system architecture platform according to an embodiment of the present disclosure.

To make the objects, technical schemes, and advantages of the present disclosure clear, the present disclosure is described in further detail with reference to accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Kubernetes is an open-source application used to manage containerized applications on multiple hosts in the cloud platform. Kubernetes aims to make the deployment of containerized applications simple and efficient. Kubernetes provides a mechanism for deployment, planning, updating, and maintenance of applications. In Kubernetes, multiple containers may be created. An application instance is run in each container. Then the management of, discovery of, and access to this group of application instances are implemented based on a built-in load balancing policy. These details do not require complex manual configuration and processing by operation and maintenance personnel. Kubernetes has a wide range of applications. Cloud computing, artificial intelligence and other platforms of many enterprises or research institutions are implemented based on Kubernetes. Kubernetes supports the management of Custom Resource Definitions (CRDs) through good scalability, allowing users to manage customized resources as a whole object entity.

However, at present, Kubernetes only supports the scheduling of Pods. Pods are the smallest units that can be created and deployed in Kubernetes. A Pod is an application instance in a Kubernetes cluster, and is always deployed on the same node. A Pod contains one or more containers, as well as resources shared by various containers, such as storage resources and network resources. Kubernetes requires a special scheduler to schedule CRDs, and resource scheduling conflicts will occur among multiple schedulers.

For Kubernetes, by default, the scheduler supports only the scheduling of Pods, and does not support the scheduling of CRD objects. For Kubernetes, by default, the scheduler cannot automatically and reasonably split CRD objects into Pods according to the current resource state. The present disclosure provides a resource scheduling method, a resource scheduling system, a device, and a computer-readable storage medium. The resource scheduling method includes: during resource scheduling, obtaining a scheduling object from a scheduling queue; if the scheduling object is a customized resource, splitting the customized resource according to a current resource state to obtain a scheduling unit list, where the scheduling unit list includes first scheduling units configured to form the customized resource; and sequentially scheduling the first scheduling units according to the scheduling unit list. The resource scheduling method can be applied to a Kubernetes scheduling platform, and correspondingly, the first scheduling units are CRD objects. During scheduling, if the scheduling object is a CRD, the CRD is split according to a current resource state to obtain a scheduling unit list, where the scheduling unit list includes a set of Pods. In this way, the Kubernetes scheduling platform can perform atomic scheduling of the Pods according to the scheduling unit list, and all the Pods are scheduled sequentially according to the queue to prevent insertion of other Pods. This ensures that the CRD can be reasonably scheduled with high scheduling efficiency, enabling the Kubernetes scheduling platform to be compatible with various service scenarios.

The technical schemes in the present disclosure will be described clearly and fully with reference to the accompanying drawings. Apparently, the embodiments described are merely some embodiments, rather than all of the embodiments of the present disclosure.

Referring to FIG. 1, FIG. 1 is a schematic diagram of a system architecture platform 100 configured for executing a resource scheduling according to an embodiment of the present disclosure. The system architecture platform 100 is a resource scheduling system.

In the embodiment shown in FIG. 1, the system architecture platform 100 includes a scheduler 110 and a splitter 120. The scheduler 110 is configured for scheduling a scheduling object. The splitter 120 is configured for splitting the scheduling object in response to a split request from the scheduler 110, to meet a scheduling requirement of the scheduler 110. During scheduling, the scheduler 110 obtains a scheduling object from a scheduling queue. When the scheduling object is a customized resource, the splitter 120 can split the customized resource according to a current resource state to obtain a scheduling unit list, where the scheduling unit list includes first scheduling units configured to form the customized resource. The scheduler 110 sequentially schedules the first scheduling units in the scheduling unit list according to the scheduling unit list, to complete the scheduling of the customized resource.

As shown in FIG. 1, a Kubernetes scheduling platform is taken as an example for description.

The Kubernetes scheduling system in this embodiment includes a scheduler 110, a splitter (i.e., Pod splitter) 120, and a controller (i.e., CRD controller) 130.

The scheduler 110 is configured for scheduling of Pods. The splitter is configured for splitting of CRD objects. The first scheduling unit is a CRD object. The second scheduling unit is a native Pod object. In this embodiment, CRDs and Pods are placed in the same scheduling queue. When the scheduling object is a CRD, the scheduler 110 obtains a set of Pods obtained by splitting the CRD through an extended split interface, and schedule all the Pods in sequence.

The splitter 120 is a user-defined extension component, which is mainly configured for splitting the CRD into reasonable Pods according to a current cluster resource occupation status in response to a split request from the scheduler 110, creating a scheduling unit list containing these Pods, and feeding the scheduling unit list back to the scheduler 110 for scheduling. In addition, the splitter 120 can implement an operation of binding the Pods to nodes in response to a node binding request from the scheduler 110. Binding of a Pod to a node may be construed as adding some node information and resource information to the Pod object, and then a special component in the scheduling system runs the Pod on a corresponding node according to the binding information.

The controller 130 is a user-defined extension component for managing states and life cycles of specific CRDs. The CRD state is updated according to the states of the CRD and the corresponding Pods. The life cycle of the CRD is maintained according to a user command or a policy for the CRD. For example, the policy for the CRD may be that the life cycle of the CRD ends after the Pod normally ends. The controller 130 is a functional component of the Kubernetes scheduling platform, and the details will not be repeated herein.

In addition, a user creates CRD and Pod objects through an API server 140. The scheduler 110 monitors binding information of the CRD and Pod objects through the API server. After the scheduling of all the Pods is completed, the splitter 120 implements the binding of the Pods to nodes through the API server.

In addition, the scheduler 110 currently has two extension modes: an extender and a scheduling framework. A split interface is added in original extension interfaces. When scheduling the CRD, the scheduler 110 obtains, through the split interface, a set of Pods obtained by splitting the CRD. The extender extends the scheduler 110 through a web hook, and the scheduling framework directly compiles the extension interface into the scheduler 110. In order to reasonably split the CRD resource, the embodiments of the present disclosure introduce a new extension interface, i.e., the Split interface, which is configured for splitting the CRD resource object and transforming the CRD into a set of Pods. Different CRD resources may be split in different ways. The split interface is implemented in the extender or scheduling framework, and is mainly responsible for two functions: splitting the CRD into a set of 1 to N Pods using a certain strategy, and allocating a specific number of resources to each Pod. In the process of splitting, it is necessary to determine whether a remaining resource of a cluster node meets a splitting requirement, for example, GPU or CPU resources. If not, the scheduler 110 returns error information. If yes, the set of Pods obtained by splitting are returned.

For the scheduling system, during scheduling, if the scheduling object is a CRD, the CRD is split according to a current resource state to obtain a scheduling unit list, where the scheduling unit list includes a set of Pods. In this way, the Kubernetes scheduling platform can perform scheduling of the Pods according to the scheduling unit list, and all the Pods are scheduled sequentially according to the queue to prevent insertion of other Pods. This ensures that the CRD can be reasonably scheduled with high scheduling efficiency, enabling the Kubernetes scheduling platform to be compatible with various service scenarios.

It should be noted that when the scheduling object is a Pod, processing is performed according to an original scheduling process of the Kubernetes scheduling system, but the operation of binding the Pods is implemented by the splitter 120. When the scheduling object is a CRD, the splitter 120 splits the CRD into one or more Pods according to the current resource state of the cluster. The splitter 120 only needs to determine the number of Pods into which the CRD is to be split and resources (CPU, memory, GPU) used by a Pod. After the splitter 120 splits the CRD, the scheduler 110 implements the scheduling of these Pods. The scheduler 110 selects appropriate nodes for the Pods by filtering, sorting, or scoring the nodes or by processing the nodes based on other optimization algorithms. The splitter 120 binds the Pods in the Pod list with the nodes. In this way, resource synchronization between the scheduler 110 and the splitter 120 can be ensured.

As such, the scheduler 110 of the Kubernetes scheduling platform can support a hybrid scheduling of CRDs and Pods and the atomic scheduling of Pods of a single CRD. It can be understood that during the hybrid scheduling of CRDs and Pods, the scheduler 110 reads a configuration and learns which CRDs participate in the scheduling. The scheduler 110 puts the Pods and the CRDs to be scheduled in the same scheduling queue. When an object scheduled by the scheduler 110 is a CRD, a Pod object list obtained by splitting the CRD object needs to be obtained through the extended Split interface, and the Pods are sequentially scheduled, thereby achieving the hybrid scheduling of CRDs and Pods.

The atomic scheduling of Pods of the CRD may be construed as that when the set of Pods obtained by splitting the CRD is scheduled, no other Pod can be scheduled. The scheduling of the CRD is considered to be successful only when the set of Pods obtained by splitting the CRD has been successfully scheduled; otherwise, the scheduling fails. This can solve the problem that the scheduling of the entire CRD as a whole fails due to insufficient remaining resources.

It should be noted that a BackOff mechanism is provided for the scheduling of the CRD. The BackOff mechanism may be construed as that if the scheduling of any one of the Pods of the CRD fails, it is determined that the scheduling of the entire CRD fails. If the scheduling of the CRD fails, the Pods in the CRD that have been successfully scheduled need to be deleted and resources need to be released. In addition, a reentry protection function is provided for the splitting of CRDs into Pods. The scheduling queue of the scheduler 110 stores CRD objects and Pod objects. A set of Pods belonging to a CRD object does not need to be inserted into the scheduling queue.

It should be noted that a resource synchronization mechanism is provided between the scheduler 110 and the splitter 120. To reasonably and optimally split the CRD, the splitter 120 needs to learn the resource state of the cluster, monitor node and Pod information, and cache allocatable resource information locally. After the scheduler 110 successfully schedules the set of Pods of the CRD, the scheduler 110 sends a binding request for the Pods to the splitter 120. After receiving the binding request, the splitter 120 first updates the allocatable resource information of nodes locally cached by the splitter 120, and then sends a final binding request to the API server 140. In this way, resource synchronization is achieved.

The system architecture platform 100 and application scenarios described in the embodiments of the present application are for the purpose of illustrating the technical schemes of the embodiments of the present application more clearly, and do not constitute a limitation on the technical schemes provided in the embodiments of the present application. Those having ordinary skills in the art may know that with the evolution of the system architecture platform 100 and the emergence of new application scenarios, the technical schemes provided in the embodiments of the present application are also applicable to similar technical problems.

Those having ordinary skills in the art may understand that the system architecture platform 100 shown in FIG. 1 do not constitute a limitation to the embodiments of the present application, and more or fewer components than those shown in the figure may be included, or some components may be combined, or a different component arrangement may be used.

Based on the above-mentioned system architecture platform 100, various embodiments of the resource scheduling method of the present disclosure are proposed.

Figure 2:
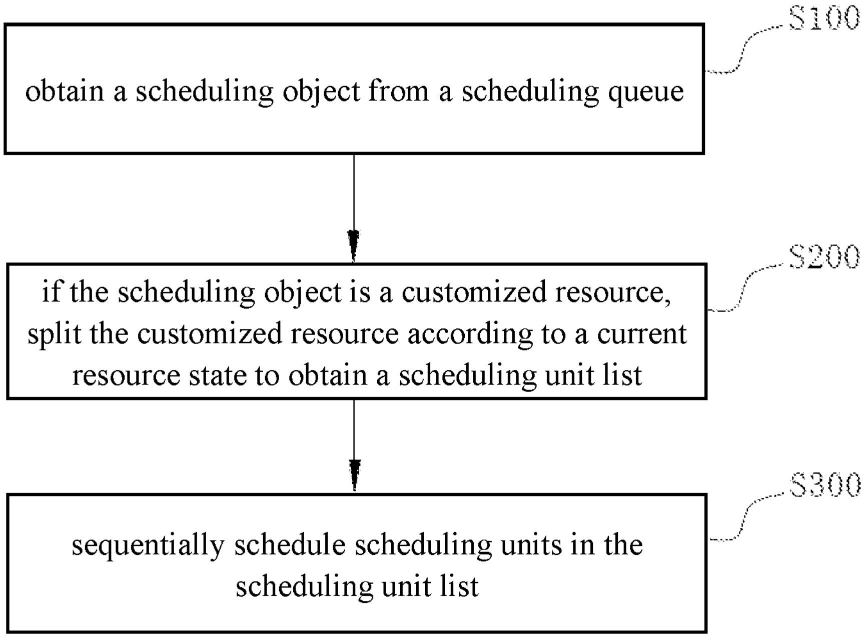
FIG. 2 is a flowchart of a resource scheduling method according to an embodiment of the present disclosure.

Referring to FIG. 2, FIG. 2 is a flowchart of a resource scheduling method according to an embodiment of the present disclosure. The resource scheduling method includes, but not limited to, the following operations S100, S200, and S300.

At S100, a scheduling object is obtained from a scheduling queue.

In an embodiment, resource scheduling may be construed as the rational and effective use of various resources. It can be understood that the scheduling object is a resource object. Schedulable objects are arranged in a queue. During scheduling, the objects are invoked according to the sequential positions or priorities of the objects in the queue, so as to obtain scheduling objects. In this way, the scheduling objects can be quickly obtained, and resources can be reasonably scheduled.

Taking the Kubernetes scheduling platform as an example for description, the Kubernetes scheduling platform may provide a variety of default resource types, e.g., a series of resources such as Pod, Deployment, Service, and Volume, which can meet most of daily requirements on system deployment and management. In some scenarios with special requirements that the existing resource types cannot meet, CRDs can be used to meet these requirements to effectively improve the scalability of Kubernetes.

It should be noted that the Kubernetes scheduling platform supports the scheduling of Pods, that is, can directly schedule Pods. It can be understood that CRDs and Pod objects may be inserted in the same scheduling queue, or a CRD may be scheduled separately. During the hybrid scheduling of CRDs and Pods, the scheduler of the Kubernetes scheduling platform reads a configuration to obtain CRD objects and Pod objects that may participate in scheduling. The scheduler puts the Pods and the CRDs to be scheduled in the same scheduling queue, and sequentially obtains and schedules the scheduling objects from the scheduling queue.

At S200, if the scheduling object is a customized resource, the customized resource is split according to a current resource state to obtain a scheduling unit list.

The scheduling unit list includes first scheduling units configured to form the customized resource. The customized resource is a CRD, and the first scheduling unit is a CRD object. It can be understood that CRD objects and native Pod objects may be inserted in the same scheduling queue, i.e., CRD objects and Pod objects may be mixed for scheduling. During the hybrid scheduling of CRDs and Pods, the scheduler sequentially obtains the scheduling objects from the scheduling queue. The scheduler first determines the type of the scheduling object during scheduling. If the scheduling object is a CRD, the CRD is split according to the current resource state to obtain a scheduling unit list. The scheduling unit list is a list of Pods that make up the CRD. In other words, the CRD is split into a set of Pods. In this way, the Kubernetes scheduling platform can directly schedule the Pods according to the list of Pods.

It can be understood that the CRD needs to be split according to the current resource status, and the current resource status may be construed as current remaining resources or available resources of the scheduling platform. When a resource request for splitting the CRD is met, the splitter reasonably splits the CRD object, so that the CRD can be scheduled according to an optimal resource allocation mode, thereby achieving higher operational efficiency.

It should be noted that when the scheduling object is a native Pod, the Pod can be directly scheduled without being split. It can be understood that the Pod is the basic unit of the Kubernetes scheduling platform, is the smallest component created or deployed by users, and is also a resource object for running container applications. All other resource objects in the Kubernetes cluster are for supporting the Pod resource object to achieve the management of application services on Kubernetes. In this way, the Kubernetes scheduling platform supports the hybrid scheduling of Pods and CRDs, and also supports the atomic scheduling of Pods of a single CRD, which ensures that the CRD can be reasonably scheduled, enabling the Kubernetes scheduling platform to be compatible with various service scenarios.

At S300, scheduling units in the scheduling unit list are sequentially scheduled.

In an embodiment, after splitting, the scheduling unit list is generated. In the Kubernetes scheduling platform, the scheduling unit is a Pod, and the scheduling unit list is a Pod set list. According to the Pod set list, the scheduler sequentially schedules all the Pods in the Pod set list, to complete the scheduling of a single CRD. It can be understood that the scheduling of all the Pods in the form of a list can prevent the insertion of other Pods that may lead to insufficient remaining resources for scheduling of the remaining Pods in the list and thus result in a failure of the scheduling of the entire CRD, and can also avoid the problem that when some Pods of another CRD are inserted during scheduling of some Pods of a CRD, the scheduling of the remaining Pods of the two CRD may fail due to insufficient remaining resources, the resources already occupied cannot be released, and the two CRDs enter a resource deadlock state.

In an embodiment, splitting the customized resource according to a current resource state to obtain a scheduling unit list in S200 may include, but not limited to, a following operation S210.

At S210, the customized resource is split to obtain the scheduling unit list when a remaining resource of a cluster node meets a requirement of splitting the customized resource.

In an embodiment, In the Kubernetes scheduling platform, the splitter is mainly configured for splitting the CRD into reasonable Pods according to a current resource occupation status of a cluster node in response to a split request from the scheduler, creating a scheduling unit list containing these Pods, and feeding the scheduling unit list back to the scheduler for scheduling. It can be seen that the splitter can learn a resource state of the cluster node by, for example, monitoring a binding status of the cluster node, and reasonably split the CRD according to the resource state to meet an optimal CRD splitting requirement.

In this way, the splitter can efficiently and reasonably split the CRD while fully considering the resource state, and the scheduler only focuses on the scheduling of Pods without having to understand the CRD, thereby achieving the splitting and scheduling of the CRD.

It should be noted that a reentry protection function is provided for the splitting of CRDs into Pods. CRD objects and Pod objects are stored in the scheduling queue of the scheduler. A set of Pods belonging to a CRD object does not need to be inserted into the scheduling queue.

Figure 3:
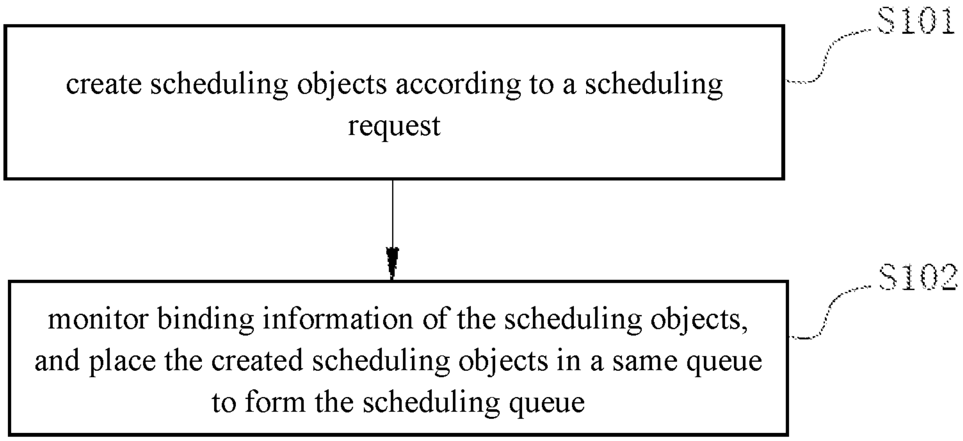
FIG. 3 is a flowchart of a resource scheduling method according to another embodiment of the present disclosure.

Referring to FIG. 3, in an embodiment, the resource scheduling method further includes, but not limited to, the following operations S101 and S102.

At S101, scheduling objects are created according to a scheduling request.

At S102, binding information of the scheduling objects is monitored, and the created scheduling objects are placed in a same queue to form the scheduling queue.

It can be understood that a user creates CRD objects and Pod objects according to an actual requirement of an application scenario. For example, deep learning of CRDs is required. The user creates CRD objects and Pod objects through the API server. The scheduler monitors binding information of the CRD objects and the Pod objects through the API server, and puts schedulable CRDs and Pods in the same queue. The CRDs and the Pods are added to the queue to form a scheduling queue. Then scheduling objects are obtained from the scheduling queue. The added scheduling objects may be CRDs and Pods, or may all be CRDs, or may all be Pods.

Figure 4:
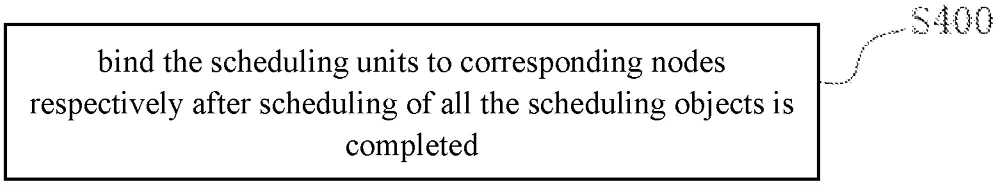
FIG. 4 is a flowchart of a resource scheduling method according to another embodiment of the present disclosure.

Referring to FIG. 4, in an embodiment, the resource scheduling method further includes, but not limited to, a following operation S400.

At S400, the scheduling units are bound to corresponding nodes respectively after scheduling of all the scheduling objects is completed.

In an embodiment, during scheduling of the CRD object in the Kubernetes scheduling platform, the CRD can be reasonably split, and the scheduling unit list is fed back to the scheduler for scheduling. The scheduler only needs to focus on the scheduling of Pods to complete the scheduling of all scheduling objects. After the scheduling of all the scheduling objects is completed, the scheduler sends a node binding request to the splitter. The splitter can implement an operation of binding the Pods to nodes in response to the node binding request from the scheduler. The splitter implements binding of the Pods to nodes through the API server.

In an embodiment, the resource scheduling method further includes, but not limited to, a following operation S500.

At S500, when scheduling of any of the first scheduling units fails, the scheduling units that have been scheduled are deleted and resources are released.

In an embodiment, If the scheduling of any Pod in the set of Pods in the CRD fails, it is determined that the scheduling of the entire CRD fails. If the scheduling of the CRD fails, the Pods in the CRD that have been successfully scheduled need to be deleted and resources need to be released, so as to avoid resource occupation and reduce the operational efficiency.

Figure 5:
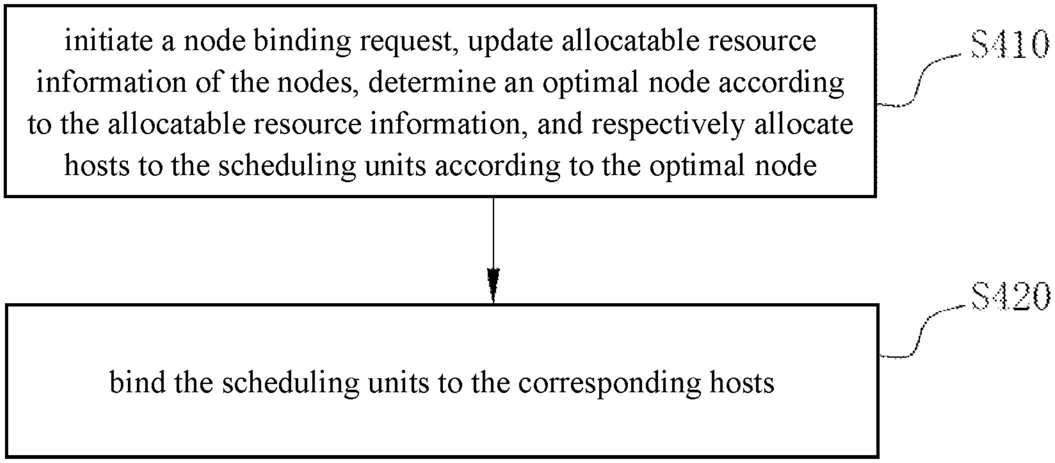
FIG. 5 is a flowchart of a resource scheduling method according to another embodiment of the present disclosure.

Referring to FIG. 5, in an embodiment, binding the scheduling units to corresponding nodes respectively after scheduling of all the scheduling objects is completed in S400 may include, but not limited to, the following operations S410 and S420.

At S410, a node binding request is initiated, allocatable resource information of the nodes is updated, an optimal node is determined according to the allocatable resource information, and hosts are respectively allocated to the scheduling units according to the optimal node.

At S420, the scheduling units are bound to the corresponding hosts.

In an embodiment, after the scheduling of all the Pods is completed, the splitter implements binding of the Pods to nodes through the API server. A node binding process is to select appropriate nodes by filtering, sorting, or scoring the nodes or by processing the nodes based on other optimization algorithms, then select an optimal node to allocate a host to the Pod, and send a binding request for the Pod to the API server, so as to bind the Pod to the corresponding host, thereby completing the binding operation.

It should be noted that when the scheduling object is a Pod, processing is performed according to an original scheduling process of the Kubernetes scheduling system, but the operation of binding the Pods is implemented by the splitter. When the scheduling object is a CRD, the splitter split the CRD into one or more Pods according to the current resource state of the cluster. The splitter only needs to determine the number of Pods into which the CRD is to be split and resources (CPU, memory, GPU) used by a Pod. After the splitter splits the CRD, the scheduler implements the scheduling of these Pods. The scheduler selects appropriate nodes for the Pods by filtering, sorting, or scoring the nodes or by processing the nodes based on other optimization algorithms. The splitter binds the Pods in the Pod list with the nodes. In this way, resource synchronization between the scheduler and the splitter can be ensured.

In addition, a resource synchronization mechanism is provided between the scheduler and the splitter. To reasonably and optimally split the CRD, the splitter needs to learn the resource state of the cluster, monitor node and Pod information, and cache allocatable resource information locally. After the scheduler successfully schedules the set of Pods of the CRD, the scheduler sends a binding request for the Pods to the splitter. After receiving the binding request, the splitter first updates the allocatable resource information of nodes locally cached by the splitter, and then sends the final binding request to the API server. In this way, resource synchronization is achieved.

Figure 6:
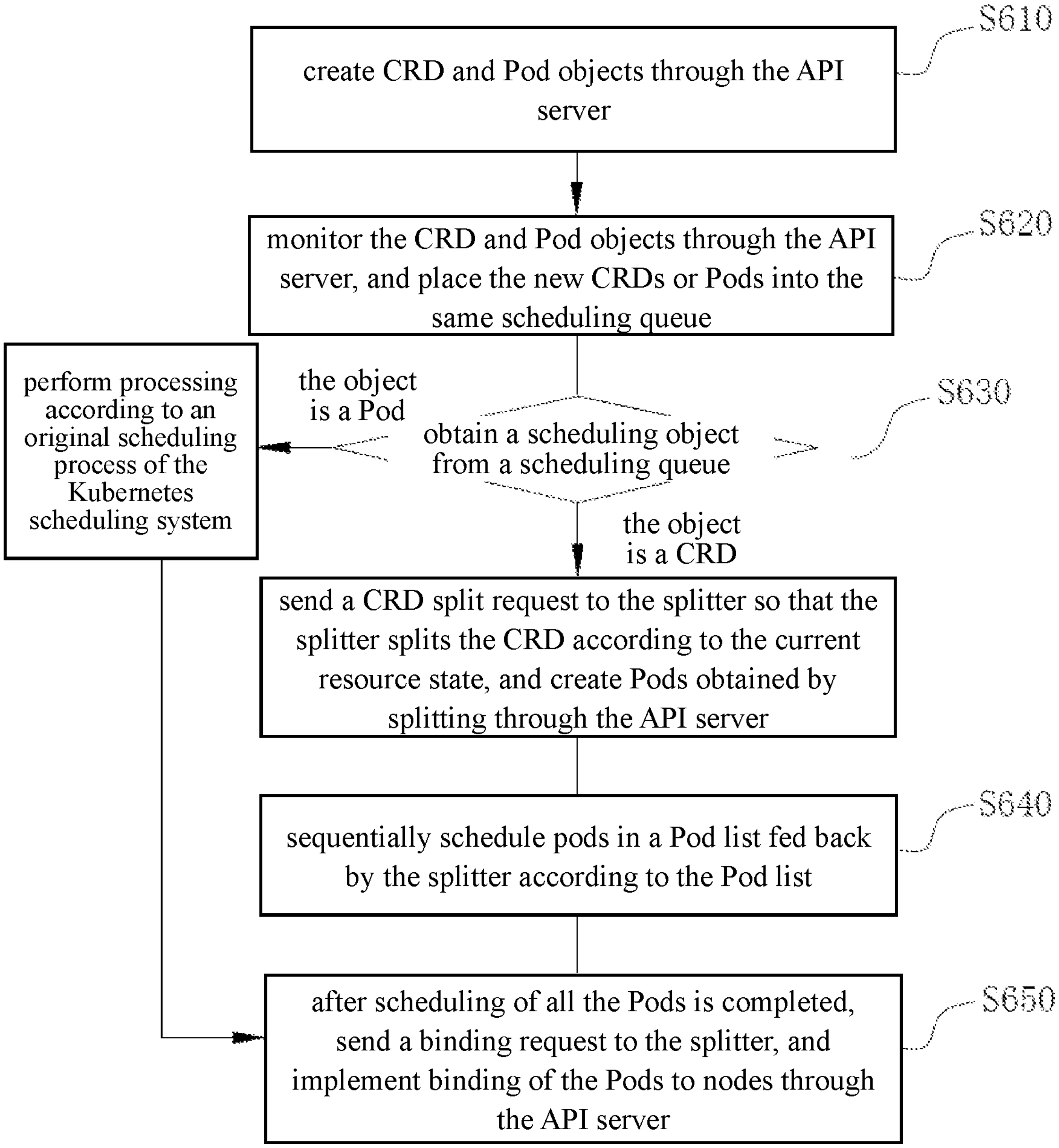
FIG. 6 is a flowchart of a resource scheduling method according to another embodiment of the present disclosure.

Referring to FIG. 6, in an embodiment, by taking a Kubernetes scheduling platform as an example, the resource scheduling method includes, but not limited to, the following operations S610 to S650.

At S610, CRD and Pod objects are created through the API server.

At S620, the CRD and Pod objects are monitored through the API server, and the new CRDs or Pods are placed into the same scheduling queue.

At S630, a scheduling object is obtained from the scheduling queue.

When the scheduling object is a Pod, processing is performed according to a Pod scheduling process.

When the scheduling object is a CRD, a CRD split request is sent to the splitter so that the splitter splits the CRD according to the current resource state, and Pods obtained by splitting are created through the API server.

At S640, pods in a Pod list fed back by the splitter are sequentially scheduled according to the Pod list.

At S650, after scheduling of all the Pods is completed, a binding request is sent to the splitter, and binding of the Pods to nodes is implemented through the API server.

To more clearly describe the specific steps and processes of the resource scheduling method in the above embodiments, five embodiments are described below.

Example Embodiment One

This embodiment is an example of the scheduler successfully performing hybrid scheduling of CRDs and Pods. The embodiment shows a process of hybrid scheduling of CRDs and Pods on the Kubernetes scheduling platform. Deep learning jobs are defined as CRDs, and Workers executed in parallel for completing the deep learning jobs are carried by Pods. The hybrid scheduling of deep learning jobs and Pods can be implemented, and the CRDs and the Pods can be run successfully.

Instance environment: A Kubernetes cluster with Ubuntu 16.04 system includes two nodes with sufficient resources. The cluster has deployed a modified scheduler, and a controller and a splitter for customized deep learning jobs.

Figure 7:
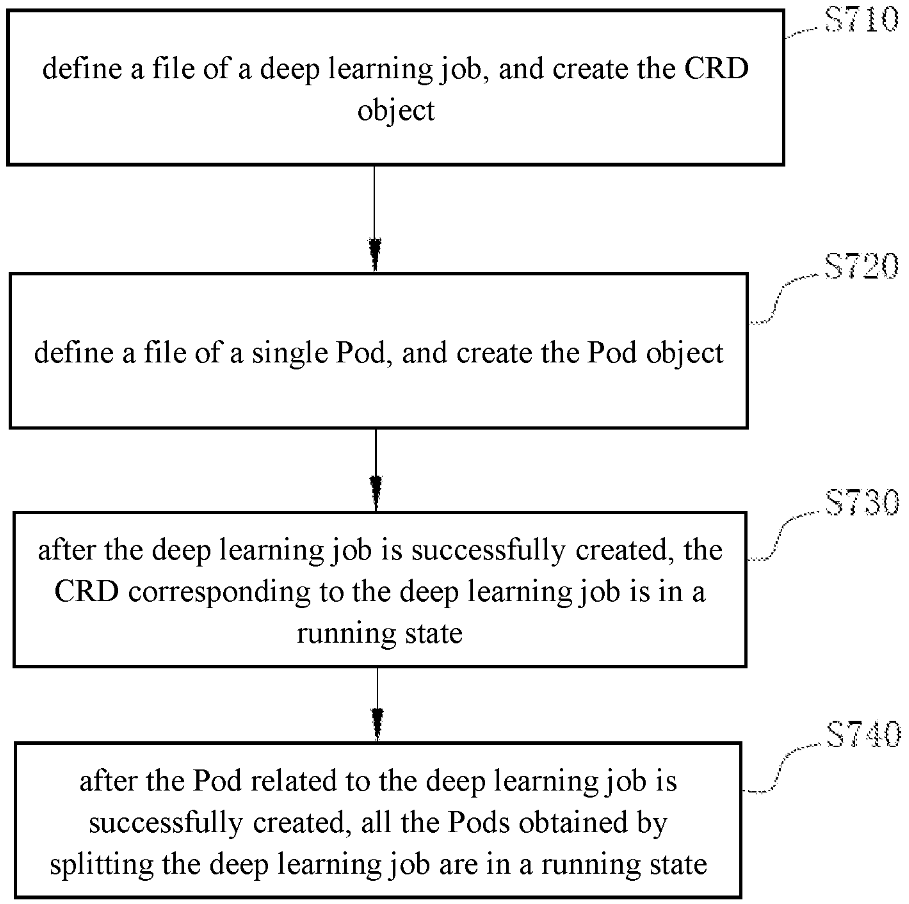
FIG. 7 is a flowchart of a resource scheduling method according to another embodiment of the present disclosure.

Referring to FIG. 7, the following operations S710 to S740 are included.

At S710, a file of a deep learning job is defined, and the CRD object is created.

At S720, a file of a single Pod is defined, and the Pod object is created.

At S730, after the deep learning job is successfully created, the CRD corresponding to the deep learning job is in a running state.

At S740, after the Pod related to the deep learning job is successfully created, all the Pods obtained by splitting the deep learning job are in a running state.

In this way, the state of the single Pod created in S720 is the running state. The state of the CRD shall be consistent with the state of the Pod obtained by splitting.

Example Embodiment Two

This embodiment is an example of the scheduler successfully performing hybrid scheduling of two types of CRD objects. The embodiment shows a process of hybrid scheduling of different CRDs on the Kubernetes scheduling platform. Deep learning jobs are defined as CRDs, machine learning jobs are defined as CRDs, and Workers executed by the two types of CRD objects are carried by Pods. The hybrid scheduling of deep learning jobs and machine learning jobs can be implemented, and both the two types of CRD objects can be run successfully.

Instance environment: A Kubernetes cluster with Ubuntu 16.04 system includes two nodes with sufficient resources. The cluster has deployed a modified scheduler, a controller and a splitter for customized deep learning jobs, and a controller and a splitter for customized machine learning jobs.

Figure 8:
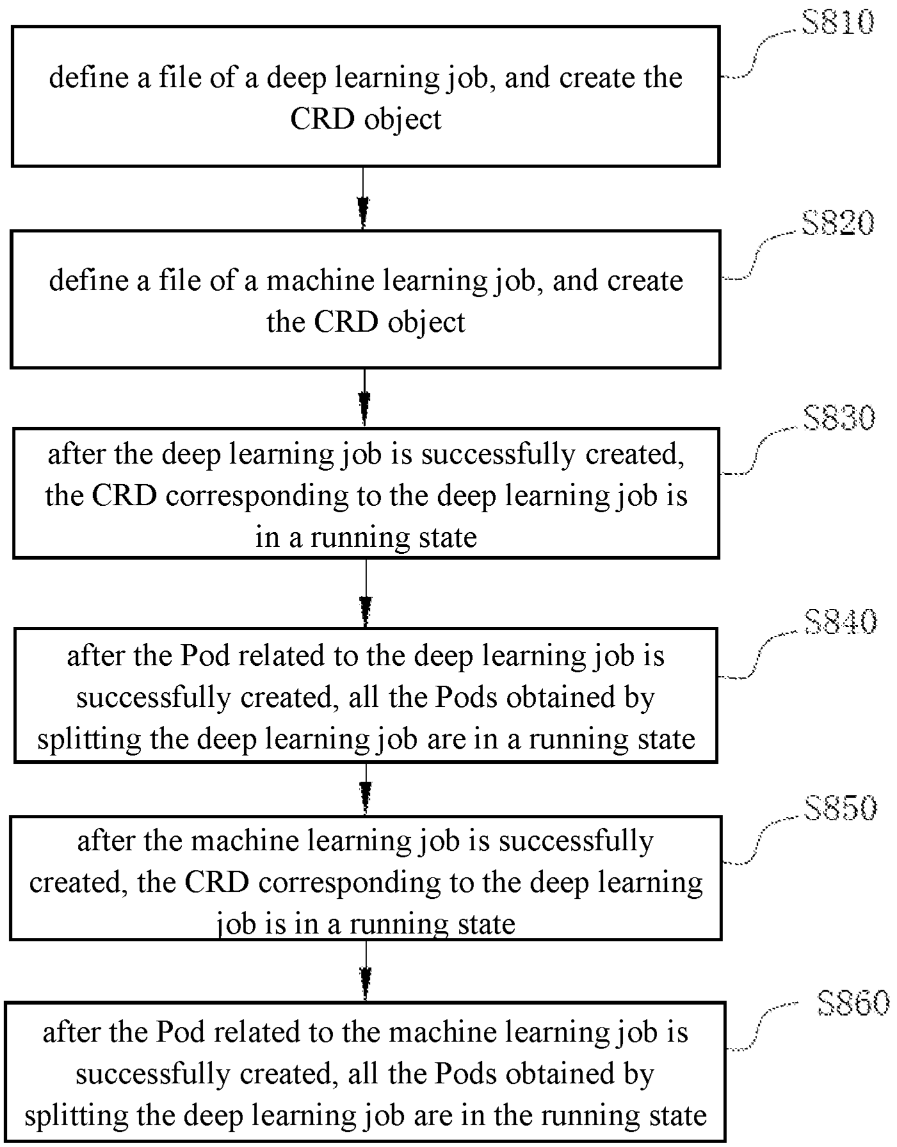
FIG. 8 is a flowchart of a resource scheduling method according to another embodiment of the present disclosure.

Referring to FIG. 8, the following operations S810 to S860 are included.

At S810, a file of a deep learning job is defined, and the CRD object is created.

At S820, a file of a machine learning job is defined, and the CRD object is created.

At S830, after the deep learning job is successfully created, the CRD corresponding to the deep learning job is in a running state.

At S840, after the Pod related to the deep learning job is successfully created, all the Pods obtained by splitting the deep learning job are in a running state.

At S850, after the machine learning job is successfully created, the CRD corresponding to the deep learning job is in a running state.

At S860, after the Pod related to the machine learning job is successfully created, all the Pods obtained by splitting the deep learning job are in a running state.

The state of the CRD shall be consistent with the state of the Pod obtained by splitting.

Example Embodiment Three

In this embodiment, the scheduler schedules a CRD to a smallest number of nodes for running. This embodiment shows that when a CRD object is scheduled on the Kubernetes scheduling platform, the CRD can be reasonably split according to the resource state. Deep learning jobs are defined as CRDs, and Workers executed in parallel for completing the deep learning jobs are carried by Pods. When scheduling the CRD, the scheduler can automatically split the CRD based on the current resource state, and schedule Pods of the CRD to a small number of nodes for running, thereby reducing network overheads and ensuring the rationality of splitting.

Instance environment: A Kubernetes cluster with Ubuntu 16.04 system includes three nodes with sufficient CPU and memory resources, where node 1 has eight idle GPUs, and nodes 2 and 3 each have four idle GPUs. The cluster has deployed a modified scheduler, and a controller and a splitter for customized deep learning jobs.

Figure 9:
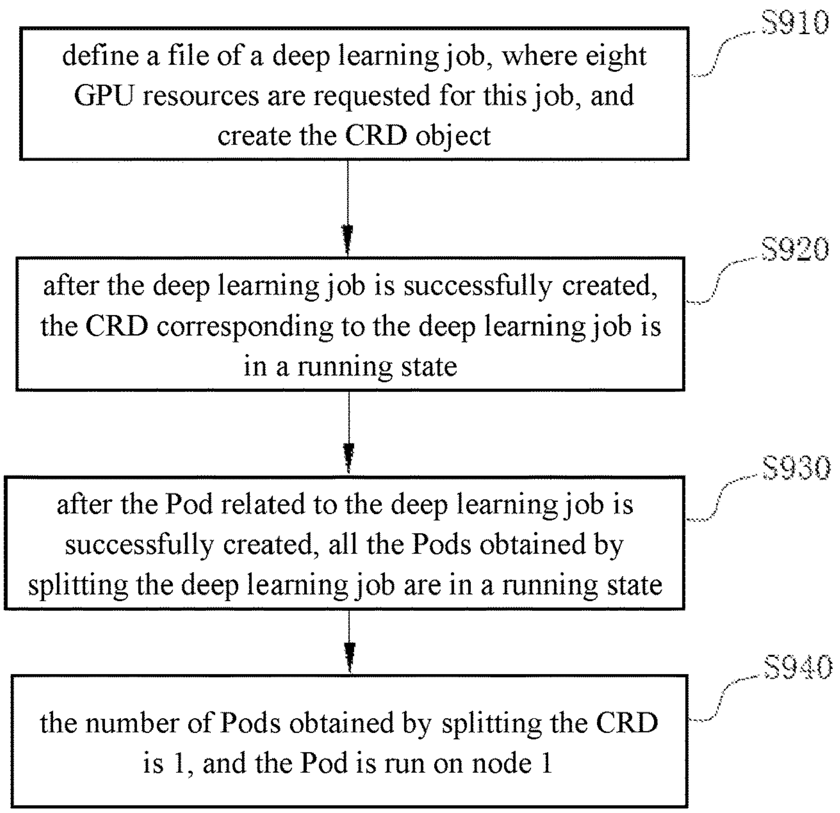
FIG. 9 is a flowchart of a resource scheduling method according to another embodiment of the present disclosure.

Referring to FIG. 9, the following operations S910 to S940 are included.

At S910, a file of a deep learning job is defined, where eight GPU resources are requested for this job, and the CRD object is created.

At S920, after the deep learning job is successfully created, the CRD corresponding to the deep learning job is in a running state.

At S930, after the Pod related to the deep learning job is successfully created, all the Pods obtained by splitting the deep learning job are in a running state.

At S940, the number of Pods obtained by splitting the CRD is 1, and the Pod is run on node 1.

Example Embodiment Four

In this embodiment, the scheduler successfully schedules a CRD with a large resource request granularity. This embodiment shows that when a CRD object is scheduled on the Kubernetes scheduling platform, the CRD can be reasonably split according to the resource state. Deep learning jobs are defined as CRDs, and Workers executed in parallel for completing the deep learning jobs are carried by Pods. When scheduling the CRD, the scheduler can automatically split the CRD based on the current resource state. If the resource request granularity of this job is large, resources of a single node cannot meet the resource request of the job, but total resources of the cluster can meet the resource request of the job, the CRD can be successfully split and successfully scheduled and run to ensure that this job will not be in a resource starved state.

Instance environment: A Kubernetes cluster with Ubuntu 16.04 system includes four nodes with sufficient CPU and memory resources, where nodes 1 and 3 each have four idle GPUs, and nodes 2 and 4 each have two idle GPUs. The cluster has deployed a modified scheduler, and a controller and a splitter for customized deep learning jobs.

Figure 10:
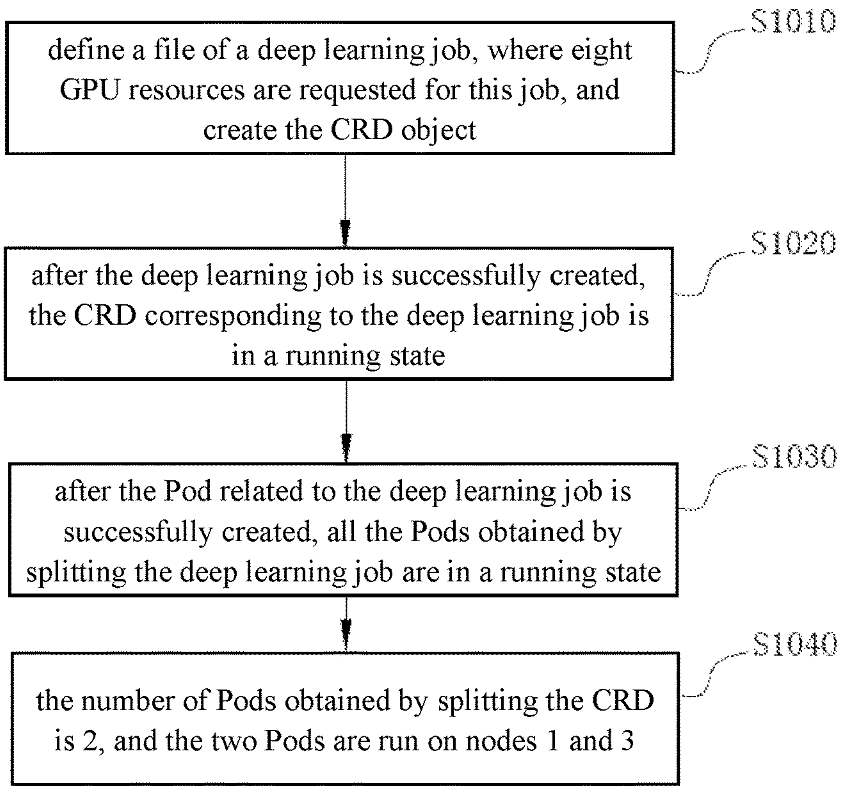
FIG. 10 is a flowchart of a resource scheduling method according to another embodiment of the present disclosure.

Referring to FIG. 10, the following operations S1010 to S1040 are included.

At S1010, a file of a deep learning job is defined, where eight GPU resources are requested for this job, and the CRD object is created.

At S1020, after the deep learning job is successfully created, the CRD corresponding to the deep learning job is in a running state.

At S1030, after the Pod related to the deep learning job is successfully created, all the Pods obtained by splitting the deep learning job are in a running state.

At S1040, the number of Pods obtained by splitting the CRD is 2, and the two Pods are run on nodes 1 and 3.

Example Embodiment Five

In this embodiment, the scheduler performs atomic scheduling of Pods obtained by splitting the CRD. The embodiment shows that the scheduler in the Kubernetes scheduling platform can schedule Pods of a single CRD object. Deep learning jobs are defined as CRDs, machine learning jobs are defined as CRDs, and Workers executed by the two types of CRD objects are carried by Pods. Thus, the atomic scheduling of the Pods of the CRD can be implemented, thereby avoiding the problems of unreasonable scheduling of the CRD and resource deadlock between two CRDs.

Instance environment: A Kubernetes cluster with Ubuntu 16.04 system includes three nodes with sufficient CPU and memory resources, where the three nodes each have four idle GPUs. The cluster has deployed a modified scheduler, a controller and a splitter for customized deep learning jobs, and a controller and a splitter for customized machine learning jobs.

Figure 11:
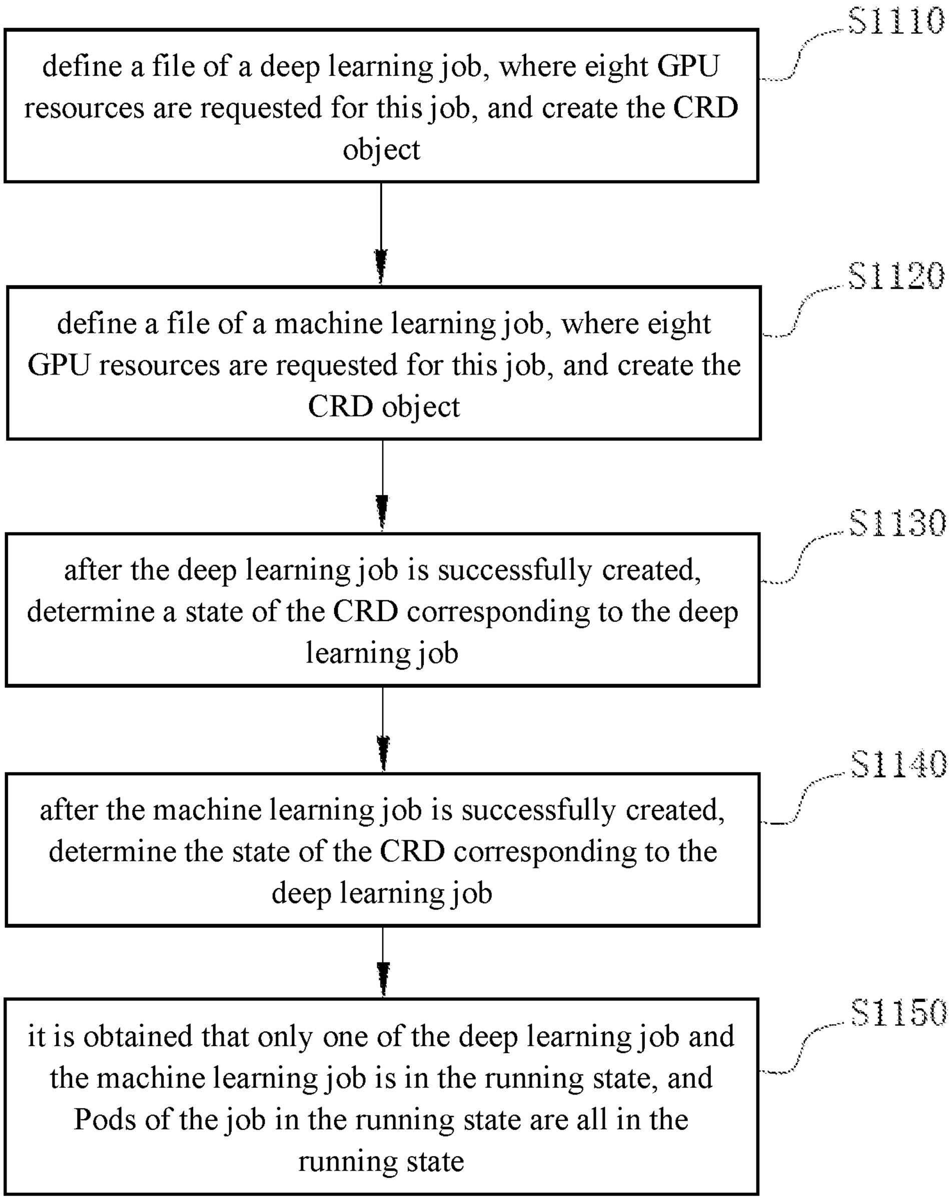
FIG. 11 is a flowchart of a resource scheduling method according to another embodiment of the present disclosure.

Referring to FIG. 11, the following operations S1110 to S1150 are included.

At S1110, a file of a deep learning job is defined, where eight GPU resources are requested for this job, and the CRD object is created.

At S1120, a file of a machine learning job is defined, where eight GPU resources are requested for this job, and the CRD object is created.

At S1130, after the deep learning job is successfully created, a state of the CRD corresponding to the deep learning job is determined.

At S1140, after the machine learning job is successfully created, the state of the CRD corresponding to the deep learning job is determined.

At S1150, it is obtained that only one of the deep learning job and the machine learning job is in the running state, and Pods of the job in the running state are all in the running state.

In addition, an embodiment of the present disclosure further provides a device. The device includes: a memory, a processor, and a computer program stored in the memory and executable by the processor. The processor and the memory may be connected by a bus or in other ways.

The memory, as a non-transitory computer-readable storage medium, may be configured for storing a non-transitory software program and a non-transitory computer-executable program. In addition, the memory may include a high-speed random access memory, and may also include a non-transitory memory, e.g., at least one magnetic disk storage device, flash memory device, or other non-transitory solid-state storage device. In some implementations, the memory may include memories located remotely from the processor, and the remote memories may be connected to the processor via a network. Examples of the network include, but are not limited to, the Internet, an intranet, a local area network, a mobile communication network, and combinations thereof.

It should be noted that the terminal in this embodiment may include the system architecture platform 100 in the embodiment shown in FIG. 1. Therefore, the terminal in this embodiment and the system architecture platform 100 in the embodiment shown in FIG. 1. belong to the same inventive concept, and these embodiments have the same implementation principle and technical effects, so the details will not be repeated here.

The non-transitory software program and instructions required to implement the resource scheduling method of the foregoing embodiments are stored in the memory which, when executed by the processor, cause the processor to implement the resource scheduling method of the foregoing embodiments, for example, implement the method operations S100 to S300 in FIG. 2, the method operations S101 to S102 in FIG. 3, the method operation S400 in FIG. 4, the method operations S410 to S420 in FIG. 5, the method operations S610 to S650 in FIG. 6, the method operations S710 to S740 in FIG. 7, the method operations S810 to S860 in FIG. 8, the method operations S910 to S940 in FIG. 9, the method operations S1010 to S1040 in FIG. 10, and the method operations S1110 to S1150 in FIG. 11.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present application also provides a computer-readable storage medium, storing a computer-executable instruction which, when executed by a processor or controller, for example, by a processor in the terminal embodiment described above, may cause the processor to implement the resource scheduling method of the foregoing embodiments, for example, implement the method operations S100 to S300 in FIG. 2, the method operations S101 to S102 in FIG. 3, the method operation S400 in FIG. 4, the method operations S410 to S420 in FIG. 5, the method operations S610 to S650 in FIG. 6, the method operations S710 to S740 in FIG. 7, the method operations S810 to S860 in FIG. 8, the method operations S910 to S940 in FIG. 9, the method operations S1010 to S1040 in FIG. 10, and the method operations S1110 to S1150 in FIG. 11.

An embodiment of the present disclosure includes: during resource scheduling, obtaining a scheduling object from a scheduling queue; if the scheduling object is a customized resource, splitting the customized resource according to a current resource state to obtain a scheduling unit list, where the scheduling unit list includes first scheduling units configured to form the customized resource; and sequentially scheduling the first scheduling units according to the scheduling unit list. The present disclosure can be applied to a Kubernetes scheduling platform. During scheduling, if the scheduling object is a CRD, the CRD is split according to a current resource state to obtain a scheduling unit list, where the scheduling unit list includes a set of Pods. In this way, the Kubernetes scheduling platform can perform atomic scheduling of all the Pods according to the scheduling unit list, and all the Pods are scheduled sequentially according to the queue to prevent insertion of other Pods. This ensures that the CRD can be reasonably scheduled with high scheduling efficiency, enabling the Kubernetes scheduling platform to be compatible with various service scenarios.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information passing medium.

Although some implementations of the present application have been described above, the present application is not limited to the implementations described above. Those having ordinary skills in the art can make various equivalent modifications or replacements without departing from the scope of the present application. Such equivalent modifications or replacements fall within the scope defined by the claims of the present application.

What is claimed is:

1. A resource scheduling method, performed by a Kubernetes scheduling platform, comprising:

obtaining a scheduling object from a scheduling queue;

in response to the scheduling object being a customized resource defined by Custom Resource Definition (CRD) and a remaining resource of a cluster node meeting a requirement of splitting the customized resource, splitting the customized resource into one or more Pods according to the requirement of the customized resource to obtain a scheduling unit list, wherein the scheduling unit list comprises a plurality of first scheduling units configured to form the customized resource; and sequentially scheduling the first scheduling units in the scheduling unit list;

wherein the one or more Pods are bound to the cluster node, and the first scheduling unit is a CRD object; and wherein after the customized resource is split into the one or more Pods, the scheduling unit list comprises the one or more Pods.

2. The resource scheduling method of claim 1, further comprising:

in response to the scheduling object being a second scheduling unit, directly scheduling the second scheduling unit.

3. The resource scheduling method of claim 2, further comprising:

binding the first scheduling unit and the second scheduling unit to corresponding nodes respectively after scheduling of all the scheduling objects is completed.

4. The resource scheduling method of claim 3, wherein after scheduling of all the scheduling objects is completed, the method further comprises:

initiating a node binding request, updating allocatable resource information of the nodes, and determining an optimal node according to the allocatable resource information.

5. The resource scheduling method of claim 1, further comprising:

creating scheduling objects according to a scheduling request; and monitoring binding information of the scheduling objects, and placing the created scheduling objects in a same queue to form the scheduling queue.

6. The resource scheduling method of claim 1, further comprising:

in response to a failure of scheduling of any of the first scheduling units, deleting the first scheduling units which have been scheduled and releasing resources.

7. A resource scheduling system, comprising:

a scheduler, configured to obtain a scheduling object from a scheduling queue; and a splitter, configured to:

split a customized resource into one or more Pods according to the requirement of the customized resource to obtain a scheduling unit list, wherein the scheduling unit list comprises a plurality of first scheduling units configured to form the customized resource in response to the scheduling object being the customized resource defined by Custom Resource Definition (CRD) and a remaining resource of a cluster node meeting a requirement of splitting the customized resource;

wherein the scheduler is further configured to sequentially schedule the first scheduling units in the scheduling unit list;

wherein the one or more Pods are bound to the cluster node, and the first scheduling unit is a CRD object; and wherein after the customized resource is split into the one or more Pods, the scheduling unit list comprises the one or more Pods.

8. The resource scheduling system of claim 7, wherein the scheduler is further configured for:

in response to the scheduling object being a second scheduling unit, directly scheduling the second scheduling unit.

9. The resource scheduling system of claim 8, wherein the splitter is further configured for:

binding the first scheduling unit and the second scheduling unit to corresponding nodes respectively.

10. The resource scheduling system of claim 9, wherein the scheduler is further configured for:

initiating a binding request, updating allocatable resource information of the nodes, and determining an optimal node according to the allocatable resource information.

11. The resource scheduling system of claim 7, wherein the scheduler is further configured for:

obtaining a scheduling request for the scheduling objects; and monitoring binding information of the scheduling objects, and placing the created scheduling objects in a same queue to form the scheduling queue.

12. The resource scheduling system of claim 7, wherein the scheduler is further configured for:

in response to a failure of scheduling of any of the first scheduling units, deleting the first scheduling units which have been scheduled and releasing resources.

13. A device, comprising a memory, a processor, and a computer program stored in the memory and executable by the processor which, when executed by the processor, causes the processor to perform the resource scheduling method of claim 1.

14. A non-transitory computer-readable storage medium, storing a computer-executable instruction which, when executed by a processor, causes the processor to perform the resource scheduling method of claim 1.

15. The device of claim 13, wherein the resource scheduling method further comprises:

in response to the scheduling object being a second scheduling unit, directly scheduling the second scheduling unit.

16. The device of claim 13, wherein the resource scheduling method further comprises:

creating scheduling objects according to a scheduling request; and monitoring binding information of the scheduling objects, and placing the created scheduling objects in a same queue to form the scheduling queue.

17. The device of claim 13, wherein the resource scheduling method further comprises:

in response to a failure of scheduling of any of the first scheduling units, deleting the first scheduling units which have been scheduled and releasing resources.

18. The non-transitory computer-readable storage medium of claim 14, wherein the resource scheduling method further comprises:

in response to the scheduling object being a second scheduling unit, directly scheduling the second scheduling unit.

19. The non-transitory computer-readable storage medium of claim 14, wherein the resource scheduling method further comprises:

creating scheduling objects according to a scheduling request; and monitoring binding information of the scheduling objects, and placing the created scheduling objects in a same queue to form the scheduling queue.

20. The non-transitory computer-readable storage medium of claim 14, wherein the resource scheduling method further comprises:

in response to a failure of scheduling of any of the first scheduling units, deleting the first scheduling units which have been scheduled and releasing resources.

* * * * *